(12) United States Patent
Zhuo et al.

(10) Patent No.: US 10,630,885 B2
(45) Date of Patent: Apr. 21, 2020

(54) FOCUSING METHOD AND TERMINAL

(71) Applicant: GUANGDONG OPPO MOBILE TELECOMMUNICATIONS CORP., LTD., Dongguan, Guangdong (CN)

(72) Inventors: Shijie Zhuo, Guangdong (CN); Xiaopeng Li, Guangdong (CN)

(73) Assignee: GUANGDONG OPPO MOBILE TELECOMMUNICATIONS CORP., LTD., Dongguan, Guangdong (CN)

(*) Notice: Subject to any disclaimer, the term of this patent is extended or adjusted under 35 U.S.C. 154(b) by 0 days.

(21) Appl. No.: 16/690,709

(22) Filed: Nov. 21, 2019

(65) Prior Publication Data
US 2020/0092490 A1 Mar. 19, 2020

Related U.S. Application Data (63) Continuation of application No. PCT/CN2018/086571, filed on May 11, 2018.

(30) Foreign Application Priority Data

May 24, 2017 (CN) .......................... 2017 1 0377555

(51) Int. Cl.
H04N 5/232 (2006.01)
G02B 7/36 (2006.01)

(52) U.S. Cl.
CPC ......... H04N 5/232122 (2018.08); G02B 7/36 (2013.01); H04N 5/232123 (2018.08)

(58) Field of Classification Search
CPC ............................................. H04N 5/232122
(Continued)

(56) References Cited

U.S. PATENT DOCUMENTS

| 7,616,254 B2 * | 11/2009 | Wong | H04N 5/23212 348/349 |
| 2010/0265177 A1 * | 10/2010 | Fujimoto | G06T 11/00 345/162 |
| 2017/0257555 A1 | 9/2017 | Li | |

FOREIGN PATENT DOCUMENTS

| CN | 104243815 | 12/2014 |
| CN | 105007420 | 10/2015 |

(Continued)

OTHER PUBLICATIONS

WIPO, ISR for PCT/CN2018/086571, dated Aug. 1, 2018.
(Continued)

Primary Examiner — Joel W Fosselman
(74) Attorney, Agent, or Firm — Hodgson Russ LLP (57) ABSTRACT

A focusing method and a terminal are provided. The method includes the following. A set of FV sampling parameter groups and a set of defocus value sampling parameter groups are obtained. A first mapping relation between step angles and FVs is determined according to the set of FV sampling parameter groups and a first predetermined fitting scheme, and a second mapping relation between the step angles and defocus values is determined according to the set of defocus value sampling parameter groups and a second predetermined fitting scheme. A first step angle in a first step angle set is determined according to the first mapping relation, and a second step angle in a second step angle set is determined according to the second mapping relation. Focusing is completed according to the first step angle and the second step angle.

20 Claims, 6 Drawing Sheets

(58) Field of Classification Search
USPC .......................................................... 348/349
See application file for complete search history.

(56) References Cited

FOREIGN PATENT DOCUMENTS

| | | |
|---|---|---|
| CN | 105549299 | 5/2016 |
| CN | 105681668 | 6/2016 |
| CN | 105827944 | 8/2016 |
| CN | 106161952 | 11/2016 |
| CN | 106385534 | 2/2017 |
| CN | 106454100 | 2/2017 |
| CN | 106713750 | 5/2017 |
| JP | 2007148249 | 6/2007 |
| WO | 2016173225 | 11/2016 |

OTHER PUBLICATIONS

SIPO, First Office Action for CN Application No. 201710377555.1, dated Feb. 22, 2019.
SIPO, Second Office Action for CN Application No. 201710377555.1, dated May 30, 2019.
SIPO, Decision to Grant Patent Right for CN Application No. 201710377555.1, dated Aug. 20, 2019.

* cited by examiner

FOCUSING METHOD AND TERMINAL

CROSS-REFERENCE TO RELATED APPLICATIONS

This application is a continuation of International Application No. PCT/CN2018/086571, filed on May 11, 2018, which claims priority to Chinese Patent Application No. 201710377555.1, filed on May 24, 2017, the entire disclosures of which are incorporated herein by reference.

TECHNICAL FIELD

This disclosure relates to the technical field of terminals, and particularly to a focusing method and a terminal.

BACKGROUND

With the rapid development of electronic technology, terminals such as mobile phones, IPADs, cameras and the like have become a necessity in people's life, and a photographing function is indispensible for the terminals. With the fast pace of life and improvement of quality of life, requirements on the photographing function are increasingly high. A focusing technology is a key factor for photographing efficiency and photographing quality.

At present, the terminals generally employ phase detection autofocus, contrast detection autofocus, or a mixed focusing method of combining the phase detection autofocus and the contrast detection autofocus to perform intelligent focusing. For the mixed focusing method, a pre-scan is performed via the phase detection autofocus and the contrast detection autofocus to roughly determine a large focusing region, and then in the large focusing region an accurate focusing position is found via an accurate scan.

SUMMARY

Implementations of the present disclosure provide a focusing method and a terminal.

According to a first aspect, the implementations of the present disclosure provide a focusing method. The focusing method includes the following. A set of focus value (FV) sampling parameter groups and a set of defocus value sampling parameter groups are obtained. A first mapping relation between step angles and FVs is determined according to the set of FV sampling parameter groups and a first predetermined fitting scheme, and a second mapping relation between the step angles and defocus values is determined according to the set of defocus value sampling parameter groups and a second predetermined fitting scheme, where the step angles are step angles of a camera driving device of a camera module. A first step angle in a first step angle set is determined according to the first mapping relation, and a second step angle in a second step angle set is determined according to the second mapping relation, where an FV corresponding to the first step angle is maximum among FVs respectively corresponding to step angles in the first step angle set, and a defocus value corresponding to the second step angle is zero. Focusing is completed according to the first step angle and the second step angle.

According to a second aspect, the implementations of the present disclosure provide a focusing method. The focusing method includes the following. A set of FV sampling parameter groups is obtained. A first mapping relation between step angles and FVs is determined according to the set of FV sampling parameter groups and a first predetermined fitting scheme, where the step angles are step angles of a camera driving device of a camera module. A first step angle in a first step angle set is determined according to the first mapping relation, where an FV corresponding to the first step angle is maximum among FVs respectively corresponding to step angles in the first step angle. A focus point of the camera module is determined according to the first step angle to complete focusing.

According to a third aspect, the implementations of the present disclosure provide a terminal. The terminal includes a processor, and a memory configured to store one or more programs. The one or more programs, when executed, are operable with the processor to perform the following. A set of FV sampling parameter groups and a set of defocus value sampling parameter groups are obtained. A first mapping relation between step angles and FVs is determined according to the set of FV sampling parameter groups and a first predetermined fitting scheme, and a second mapping relation between the step angles and defocus values is determined according to the set of defocus value sampling parameter groups and a second predetermined fitting scheme, where the step angles are step angles of a camera driving device of a camera module. A first step angle in a first step angle set is determined according to the first mapping relation, and a second step angle in a second step angle set is determined according to the second mapping relation, where an FV corresponding to the first step angle is maximum among FVs respectively corresponding to step angles in the first step angle set, and a defocus value corresponding to the second step angle is zero. Focusing is completed according to the first step angle and the second step angle.

BRIEF DESCRIPTION OF THE DRAWINGS

To describe technical solutions of implementations of the present disclosure more clearly, the following will give a brief description of accompanying drawings used for describing the implementations of the present disclosure. Apparently, the accompanying drawings described in the following merely illustrate some implementations of the present disclosure. Those of ordinary skill in the art can also obtain other accompanying drawings based on the accompanying drawings without creative efforts.

DETAILED DESCRIPTION

In order to enable those skilled in the art to better understand technical solutions of the present disclosure, the technical solutions embodied in implementations of the present disclosure will be described in a clear and comprehensive manner in conjunction with the accompanying drawings. It is apparent that the implementations described herein are merely some of rather than all the implementations of the present disclosure. Based on the implementations of the present disclosure, all other implementations obtained by those of ordinary skill in the art without creative efforts shall fall within the protection scope of the present disclosure.

The terms "first", "second" and the like used in the specification, the claims, and the accompany drawings of the present disclosure are used to distinguish different objects rather than describe a particular order. In addition, the terms "include", "comprise", and "have" as well as variations thereof are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

The term "embodiment" or "implementation" referred to herein means that a particular feature, structure, or characteristics described in conjunction with the implementations may be contained in at least one implementation of the present disclosure. The phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

Terminals involved in the implementations of the present disclosure may include various handheld devices, in-vehicle devices, wearable devices, computing devices that have wireless communication functions, or other processing devices coupled to a wireless modem, as well as various forms of user equipment (UE), mobile stations (MS), terminal devices, and the like. For simplifying description, the devices mentioned above are collectively referred to as the terminals. The following will describe the implementations of the present disclosure in detail.

According to an implementation of the present disclosure, a focusing method is provided. The focusing method includes the following. A set of FV sampling parameter groups and a set of defocus value sampling parameter groups are obtained. A first mapping relation between step angles and FVs is determined according to the set of FV sampling parameter groups and a first predetermined fitting scheme, and a second mapping relation between the step angles and defocus values is determined according to the set of defocus value sampling parameter groups and a second predetermined fitting scheme, where the step angles are step angles of a camera driving device of a camera module. A first step angle in a first step angle set is determined according to the first mapping relation, and a second step angle in a second step angle set is determined according to the second mapping relation, where an FV corresponding to the first step angle is maximum among FVs respectively corresponding to step angles in the first step angle set, and a defocus value corresponding to the second step angle is zero. Focusing is completed according to the first step angle and the second step angle.

According to an implementation of the present disclosure, a focusing method is provided. The focusing method includes the following. A set of FV sampling parameter groups is obtained. A first mapping relation between step angles and FVs is determined according to the set of FV sampling parameter groups and a first predetermined fitting scheme, where the step angles are step angles of a camera driving device of a camera module. A first step angle in a first step angle set is determined according to the first mapping relation, where an FV corresponding to the first step angle is maximum among FVs respectively corresponding to step angles in the first step angle. A focus point of the camera module is determined according to the first step angle to complete focusing.

According to an implementation of the present disclosure, a terminal is provided. The terminal includes a processor, and a memory configured to store one or more programs. The one or more programs, when executed, are operable with the processor to perform the following. A set of FV sampling parameter groups and a set of defocus value sampling parameter groups are obtained. A first mapping relation between step angles and FVs is determined according to the set of FV sampling parameter groups and a first predetermined fitting scheme, and a second mapping relation between the step angles and defocus values is determined according to the set of defocus value sampling parameter groups and a second predetermined fitting scheme, where the step angles are step angles of a camera driving device of a camera module. A first step angle in a first step angle set is determined according to the first mapping relation, and a second step angle in a second step angle set is determined according to the second mapping relation, where an FV corresponding to the first step angle is maximum among FVs respectively corresponding to step angles in the first step angle set, and a defocus value corresponding to the second step angle is zero. Focusing is completed according to the first step angle and the second step angle.

Figure 1:
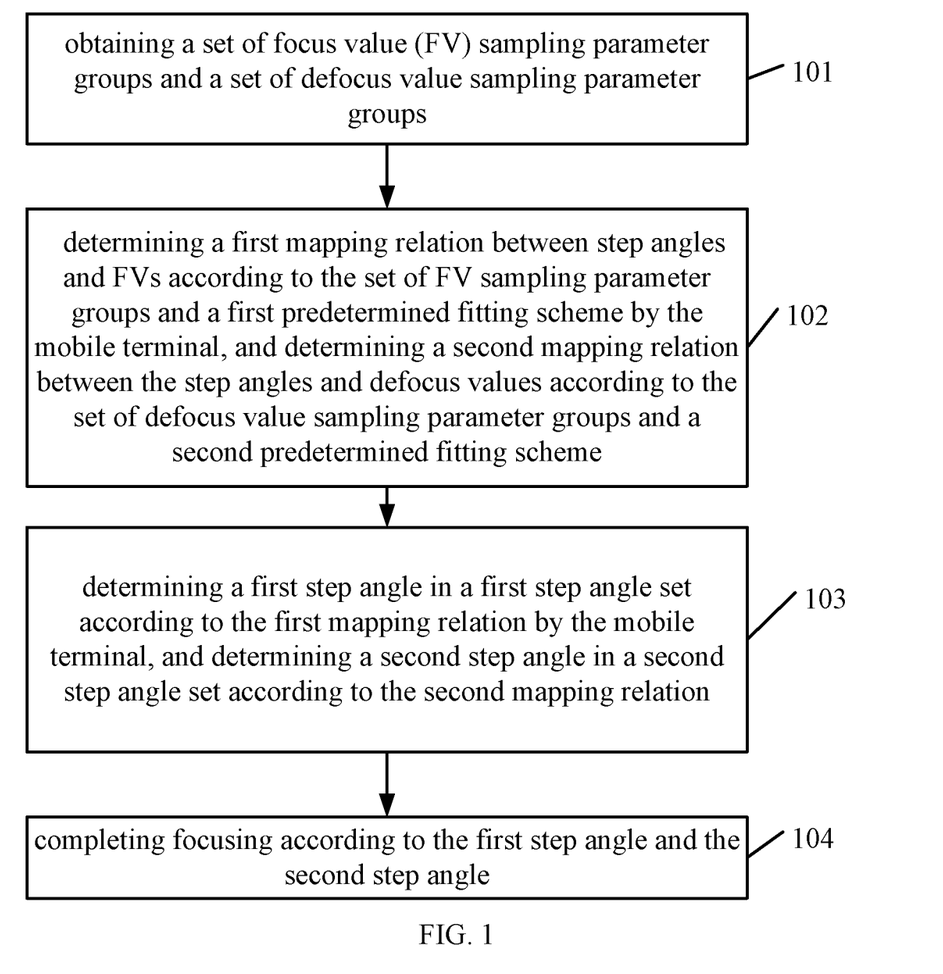
FIG. 1 is a schematic flow chart illustrating a focusing method according to an implementation of the present disclosure.

FIG. 1 is a schematic flow chart illustrating a focusing method according to an implementation of the present disclosure. As illustrated in FIG. 1, the focusing method includes the following.

At block 101, the terminal obtains a set of FV sampling parameter groups and a set of defocus value sampling parameter groups.

The FVs are obtained via contrast detection autofocus. The FVs have positive correlation with image sharpness. The larger the FV, the clearer the image. The defocus values are obtained via phase detection autofocus. The closer the defocus value approaches zero, the clear the image.

In a possible example, the set of FV sampling parameter groups and the set of defocus value sampling parameter groups are obtained as follows. According to a fourth step angle set, the camera module is controlled to perform a second scan so as to obtain the set of FV sampling parameter groups and the set of defocus value sampling parameter groups. Each FV sampling parameter group in the set of FV sampling parameter groups includes a step angle in the fourth step angle set and a corresponding FV. Each defocus value sampling parameter group in the set of defocus value sampling parameter groups includes a step angle in the fourth step angle set and a corresponding defocus value.

The step angles are step angles of a camera driving device of the camera module.

The camera driving device may be a stepper motor, and there is no limitation on the camera driving device herein. Upon receipt of a pulse signal, the camera driving device moves step by step according to the step angles.

The fourth step angle set may be a preset step angle set, and indicates a maximum range in which the camera driving device can perform a scan.

For example, if the fourth step angle set includes step angles ranging from 0 degree to 1000 degrees, and a step amplitude is 10 degrees, the camera driving device performs the second scan as follows. The camera driving device moves a step angle of 10 degrees each time to obtain a corresponding FV and a corresponding defocus value. After the camera driving device moves 100 times, the set of FV sampling parameter groups and the set of defocus value sampling parameter groups are respectively obtained.

It can be seen that in the example, the terminal performs the second scan according to the fourth step angle set, and obtains the set of FV sampling parameter groups and the set of defocus value sampling parameter groups via a quick scan performed according to a large step amplitude, such that the terminal can determine a small range of focusing according to the set of FV sampling parameter groups and the set of defocus value sampling parameter groups, thereby facilitating accurate focusing and reducing time taken for focusing of the terminal.

At block 102, the terminal determines a first mapping relation between the step angles and FVs according to the set of FV sampling parameter groups and a first predetermined fitting scheme, and determines a second mapping relation between the step angles and defocus values according to the set of defocus value sampling parameter groups and a second predetermined fitting scheme.

The first predetermined fitting scheme may be a parabolic and nonlinear fitting scheme, and the second predetermined fitting scheme may be a linear fitting scheme.

At block 103, the terminal determines a first step angle in a first step angle set according to the first mapping relation, and determines a second step angle in a second step angle set according to the second mapping relation.

An FV corresponding to the first step angle is maximum among FVs respectively corresponding to step angles in the first step angle set, and a defocus value corresponding to the second step angle is zero.

The fourth step angle set includes step angles in the first step angle set and step angles in the second step angle set. The first step angle set includes a step angle corresponding to a maximum FV among FVs in the set of the FV sampling parameter groups. The second step angle set includes a step angle corresponding to a defocus value of zero in the set of defocus value sampling parameter groups.

The first step angle set and the second step angle set may be obtained by narrowing the fourth step angle set according to the set of FV sampling parameter groups and the set of defocus value sampling parameter groups. Thus, a range of polling when determining the first step angle and the second step angle is reduced, thereby reducing time taken for determining the first step angle and the second step angle.

Figure 2:
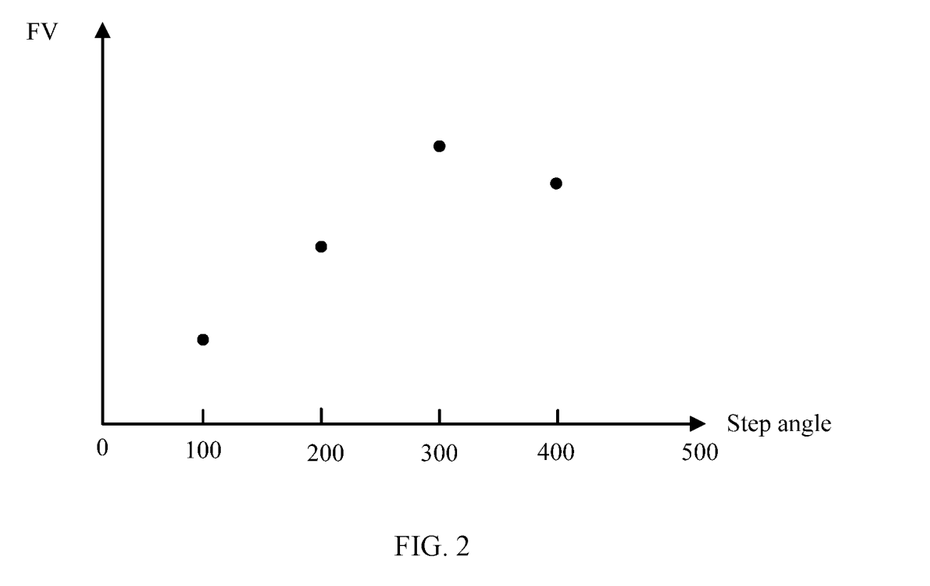
FIG. 2 is a schematic view illustrating distribution of a set of FV sampling parameter groups according to an implementation of the present disclosure.

For example, in the set of FV sampling parameter groups as illustrated in FIG. 2, FVs respectively corresponding to step angles ranging from 0 degree to 300 degrees gradually increase, and an FV corresponding to a step angle of 400 degrees is smaller than that corresponding to the step angle of 300 degrees, thus it indicates that a maximum FV may be an FV corresponding to a step angle in a step angle range from 300 degrees to 400 degrees. Therefore, the first step angle set can be set to include step angles ranging from 300 degrees to 400 degrees, or set to include step angles a difference between each of which and a step angle of 350 degrees is within a range from −100 degrees to 100 degrees, that is, the first step angle set includes step angles ranging from 250 degrees to 450 degrees. There is no limitation on the first step angle set.

Figure 3:
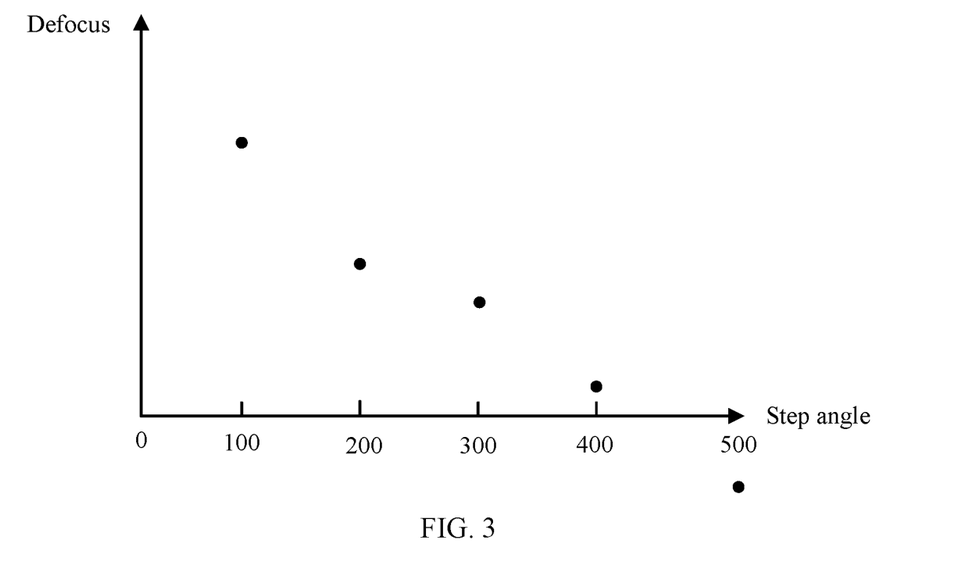
FIG. 3 is a schematic view illustrating distribution of a set of defocus value sampling parameter groups according to an implementation of the present disclosure.

For example, in the set of defocus value sampling parameter groups as illustrated in FIG. 3, defocus values respectively corresponding to step angles ranging from 0 degree to 400 degrees are larger than zero, and a defocus value corresponding to a step angle of 500 degrees is smaller than zero, thus it indicates that a defocus value corresponding to a step angle in a step angle range from 400 degrees to 500 degrees may be zero. Thus, the second step angle set may be set to include step angles ranging from 400 degrees to 500 degrees.

At block 104, the terminal completes focusing according to the first step angle and the second step angle.

The terminal can complete focusing according to a goodness of fit between the first step angle and the second step angle.

It can be seen that in the implementation of the present disclosure, the terminal first obtains the set of FV sampling parameter groups and the set of defocus value sampling parameter groups, determines the first mapping relation between the step angles and the FVs according to the set of the FV sampling parameter groups and the first predetermined fitting scheme, determines the second mapping relation between the step angles and the defocus values according to the set of defocus value sampling parameter groups and the second predetermined fitting scheme, determines the first step angle in the first step angle set according to the first mapping relation, determines the second step angle in the second step angle set according to the second mapping relation, and finally completes focusing according to the first step angle and the second step angle. It can be seen that after the terminal obtains the set of FV sampling parameter groups and the set of defocus value sampling parameter groups, without multiple scans, the terminal can determine the first step angle according to the first fitting scheme, and determine the second step angle according to the second fitting scheme, so as to complete focusing. Thus, there is no need for the terminal to take a long time to perform multiple scans so as to complete focusing, thereby reducing time taken for focusing, reducing hardware cost, increasing a speed of focusing of the terminal, and prolonging service life of related hardware components.

In a possible example, the terminal completes focusing according to the first step angle and the second step angle as follows. The terminal determines a difference between the first step angle and the second step angle as a first reference value, and completes focusing according to the first reference value.

According to the first reference value, the terminal can complete focusing in various manners. For example, the terminal may store a mapping relation between the first reference value and a focus point. By querying the mapping relation, the terminal determines the focus point corresponding to the first reference value, and completes focusing according to the focus point. In other examples, the terminal may determine a step angle corresponding to the first reference value according to multiple historical focusing records, and enables the camera driving device to rotate the step angle so as to complete focusing. There is no limitation on completing focusing according to the first reference value.

It can be seen that in this example, the manner in which the terminal completes focusing according to the difference between the first step angle and the second step angle is simple and easy to operate, thereby reducing complexity of focusing of the terminal, reducing time taken for focusing, reducing hardware cost, further improving an efficiency of focusing of the terminal, and prolonging the service life of the related hardware components.

In a possible example, the terminal completes focusing according to the first step angle and the second step angle as follows. The terminal determines the difference between the first step angle and the second step as a second reference value, determines whether the second reference value is smaller than or equal to a preset threshold, determines an average value of the first step angle and the second step angle when the second reference value is smaller than or equal to the preset threshold, and completes focusing according to the average value.

It can be seen that in this example, when the second reference value is smaller than or equal to the preset threshold, without further accurate determination, the terminal can complete focusing according to the average value of the first step angle and the second step angle, thereby reducing time taken for focusing while ensuring an accuracy of focusing, and improving the efficiency of focusing of the terminal.

In a possible example, the terminal completes focusing according to the first step angle and the second step angle as follows. The terminal determines the difference between the first step angle and the second step angle as a third reference value, determines whether the third reference value is larger than the predetermined threshold, determines a third step angle set for a first scan according to the average value of the first step angle and the second step angle when the third reference value is larger than the preset threshold, controls, according to the third step angle set, the camera module to perform the first scan so as to determine a third step angle in the third step angle set, and completes focusing according to the third step angle.

The third step angle set may be determined with the average value of the first step angle and the second step angle as a reference value, and a difference between each of step angles in the third step angle set and the reference value falls within a preset range.

A step amplitude for the first scan is smaller than that for the second scan. The first scan is an accurate scan. By means of the first scan, the terminal determines in the third step angle set a fourth step angle corresponding to a maximum FV and a fifth step angle corresponding to the defocus value of zero, and completes focusing according to the fourth step angle and the fifth step angle.

It can be seen that in this example, when the third reference value is larger than the preset threshold, according to the average value of the first step angle and the second step angle, the terminal limits the first scan to a reduced range, i.e., the third step angle set, thereby reducing the range of polling in the first scan, realizing accurate focusing via the first scan, and increasing the accuracy of focusing.

Figure 4:
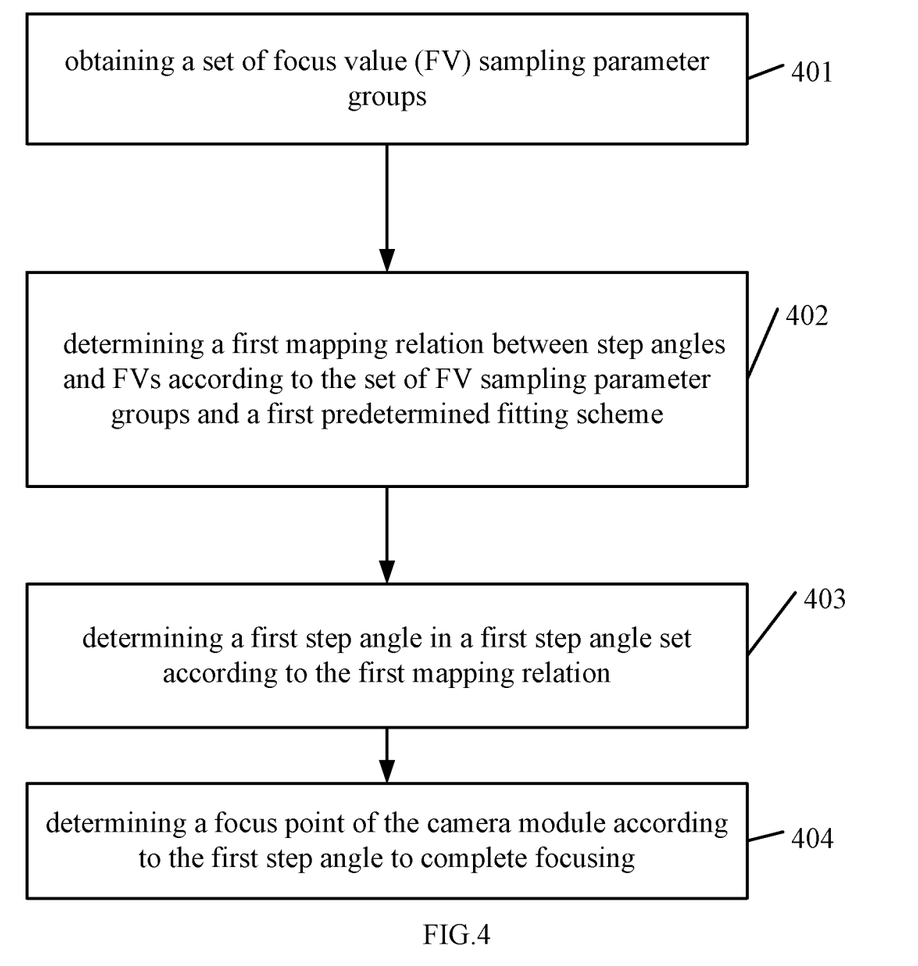
FIG. 4 is schematic flow chart illustrating a focusing method according to another implementation of the present disclosure.

FIG. 4 is a schematic flow chart illustrating a focusing method according to another implementation of the present disclosure. As illustrated in FIG. 4, the focusing method includes the following.

At block 401, the terminal obtains a set of FV sampling parameter groups.

In a possible example, the set of FV sampling parameter groups is obtained as follows. According to a fourth step angle set, a camera module is controlled to perform a second scan to obtain the set of FV sampling parameter groups. Each FV sampling parameter group in the set of FV sampling parameter groups includes a step angle in the fourth step angle set and a corresponding FV.

It can be seen that in the example, the terminal performs the second scan according to the fourth step angle set, and obtains the set of FV sampling parameter groups via a quick scan performed according to a large step amplitude, such that the terminal can determine a small range of focusing according to the set of FV sampling parameter groups, thereby facilitating accurate focusing and reducing time taken for focusing of the terminal.

At block 402, the terminal determines a first mapping relation between step angles and FVs according to the set of FV sampling parameter groups and a first predetermined fitting scheme.

The step angles are step angles of a camera driving device of the camera module.

The first predetermined fitting scheme may be a parabolic and nonlinear fitting scheme.

At block 403, the terminal determines a first step angle in a first step angle set according to the first mapping relation.

An FV corresponding to the first step angle is maximum among FVs respectively corresponding to step angles in the first step angle set.

At block 404, the terminal determines a focus point of the camera module according to the first step angle to complete focusing.

It can be seen that in the implementation of the present disclosure, the terminal first obtains the set of FV sampling parameter groups, determines the first mapping relation between the step angles and the FVs according to the set of the FV sampling parameter groups and the first predetermined fitting scheme, and then determines the first step angle in the first step angle set according to the first mapping relation, where the FV corresponding to the first step angle is maximum among the FVs respectively corresponding to the step angles in the first step angle set. The terminal finally determines the focus point of the camera module according to the first step angle to complete focusing. It can be seen that after the terminal obtains the set of FV sampling parameter groups, without multiple scans, the terminal can determine the first step angle according to the first fitting scheme to complete focusing, and thus there is no need for the terminal to take a long time to perform multiple scans so as to complete focusing, thereby reducing time taken for focusing, reducing hardware cost, increasing a speed of focusing of the terminal, and prolonging service life of related hardware components.

Figure 5:
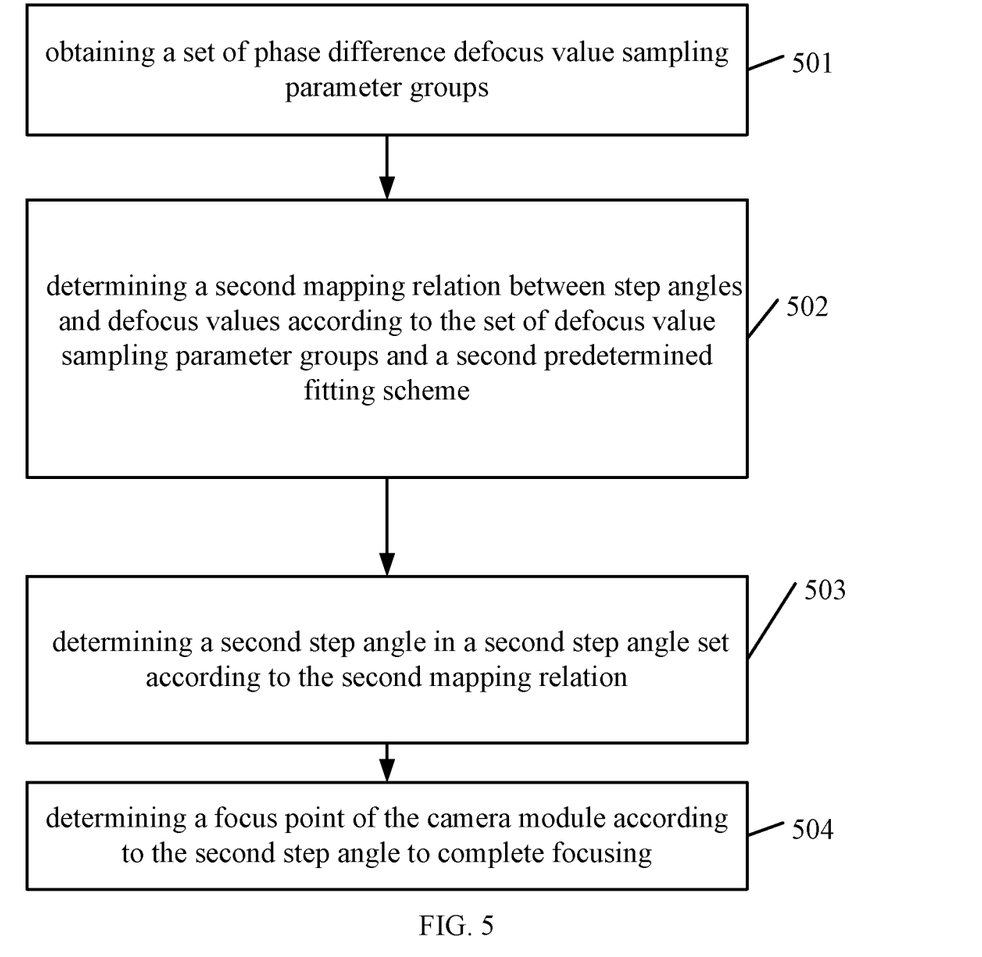
FIG. 5 is a schematic flow chart illustrating a focusing method according to yet another implementation of the present disclosure.

FIG. 5 is a schematic flow chart illustrating a focusing method according to another implementation of the present disclosure. As illustrated in FIG. 5, the focusing method includes the following.

At block 501, the terminal obtains a set of defocus value sampling parameter groups.

In a possible example, the set of defocus value sampling parameter groups is obtained as follows. According to a fourth step angle set, a camera module is controlled to perform a second scan to obtain the set of defocus value sampling parameter groups. Each defocus value sampling parameter group in the set of defocus value sampling parameter groups includes a step angle in the fourth step angle set and a corresponding defocus value.

The step angles are step angles of a camera driving device of the camera module.

It can be seen that in the example, the terminal performs the second scan according to the fourth step angle set, and obtains the set of defocus value sampling parameter groups via a quick scan performed according to a large step amplitude, such that the terminal can determine a small range of focusing according to the set of defocus value sampling parameter groups, thereby facilitating accurate focusing and reducing time taken for focusing of the terminal.

At block 502, the terminal determines a second mapping relation between the step angles and defocus values according to the set of defocus value sampling parameter groups and a second predetermined fitting scheme. The second predetermined fitting scheme may be a linear fitting scheme.

At block 503, the terminal determines a second step angle in a second step angle set according to the second mapping relation. A defocus value corresponding to the second step angle is zero.

At block 504, the terminal determines a focus point of the camera module according to the second step angle to complete focusing.

It can be seen that in the implementation of the present disclosure, the terminal first obtains the set of defocus value sampling parameter groups, determines the second mapping relation between the step angles and the defocus values according to the set of defocus value sampling parameter groups and the second predetermined fitting scheme, and then determines the second step angle in the second step angle set according to the second mapping relation, where the defocus value corresponding to the second step angle is zero. The terminal finally determines the focus point of the camera module according to the second step angle to complete focusing. It can be seen that after the terminal obtains the set of defocus value sampling parameter groups, without multiple scans, the terminal can determine the second step angle according to the second fitting scheme to complete focusing, and thus there is no need for the terminal to take a long time to perform multiple scans so as to complete focusing, thereby reducing time taken for focusing, reducing hardware cost, increasing a speed of focusing of the terminal, and prolonging service life of related hardware components.

Figure 6:
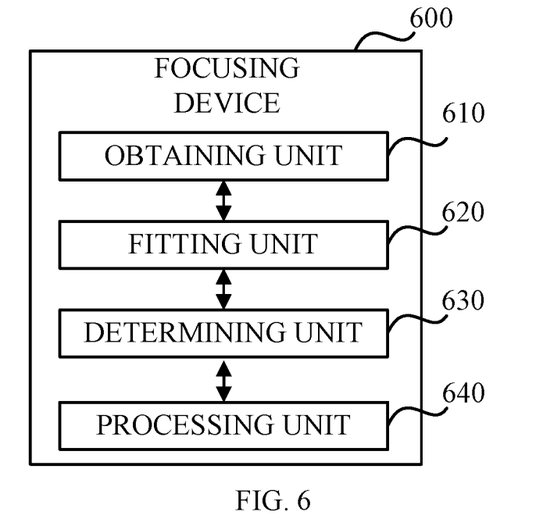
FIG. 6 is a schematic structural diagram illustrating a focusing device according to an implementation of the present disclosure.

FIG. 6 is a schematic structural view illustrating a focusing device according to an implementation of the present disclosure. A focusing device 600 includes an obtaining unit 610, a fitting unit 620, a determining unit 630, and a processing unit 640.

The obtaining unit 610 is configured to obtain a set of FV sampling parameter groups and a set of defocus value sampling parameter groups.

The fitting unit 620 is configured to determine a first mapping relation between step angles and FVs according to the set of FV sampling parameter groups obtained by the obtaining unit 610 and a first predetermined fitting scheme, and determine a second mapping relation between the step angles and defocus values according to the set of defocus value sampling parameter groups obtained by the obtaining unit 610 and a second predetermined fitting scheme, where the step angles are step angles of a camera driving device of a camera module.

The determining unit 630 is configured to determine a first step angle in a first step angle set according to the first mapping relation determined by the fitting unit 620, and determine a second step angle in a second step angle set according to the second mapping relation determined by the fitting unit 620, where an FV corresponding to the first step angle is maximum among FVs respectively corresponding to step angles in the first step angle set, and a defocus value corresponding to the second step angle is zero.

The processing unit 640 is configured to complete focusing according to the first step angle and the second step angle determined by the determining unit 630.

It can be seen that in the implementation of the present disclosure, the obtaining unit 610 of the focusing device 400 first obtains the set of FV sampling parameter groups and the set of defocus value sampling parameter groups. The fitting unit 620 determines the first mapping relation between the step angles and the FVs according to the set of FV sampling parameter groups and the first predetermined fitting scheme, and determines the second mapping relation between the step angles and the defocus values according to the set of defocus value sampling parameter groups and the second predetermined fitting scheme. The determining unit 630 determines the first step angle in the first step angle set according to the first mapping relation, and determines the second step angle in the second step angle set according to the second mapping relation. The processing unit 640 finally completes focusing according to the first step angle and the second step angle. It can be seen that after the terminal obtains the set of FV sampling parameter groups and the set of defocus value sampling parameter groups, without multiple scans, the terminal can determine the first step angle according to the first fitting scheme, and determine the second step angle according to the second fitting scheme, so as to complete focusing. Thus, there is no need for the terminal to take a long time to perform multiple scans so as to complete focusing, thereby reducing time taken for focusing, reducing hardware cost, increasing a speed of focusing of the terminal, and prolonging service life of related hardware components.

In a possible example, the processing unit 640 configured to complete focusing according to the first step angle and the second step angle determined by the determining unit 630 is configured to determine a difference between the first step angle and the second step angle as a first reference value, and complete focusing according to the first reference value.

It can be seen that in this example, the manner in which the terminal completes focusing according to the difference between the first step angle and the second step angle is simple and easy to operate, thereby reducing complexity of focusing of the terminal, reducing time taken for focusing, reducing hardware cost, further improving an efficiency of focusing of the terminal, and prolonging the service life of the related hardware components.

In a possible example, the processing unit 640 configured to complete focusing according to the first step angle and the second step angle determined by the determining unit 630 is configured to determine the difference between the first step angle and the second step angle as a second reference value, determine whether the second reference value is smaller than or equal to a preset threshold, determine an average value of the first step angle and the second step angle based on a determination that the second reference value is smaller than or equal to the preset threshold, and complete focusing according to the average value.

It can be seen that in this example, when the second reference value is smaller than or equal to the preset threshold, without further accurate determination, the terminal can complete focusing according to the average value of the first step angle and the second step angle, thereby reducing time taken for focusing while ensuring an accuracy of focusing, and improving the efficiency of focusing of the terminal.

In a possible example, the processing unit 640 configured to complete focusing according to the first step angle and the second step angle determined by the determining unit 630 is configured to determine the difference between the first step angle and the second step angle as a third reference value, determine whether the third reference value is larger than the preset threshold, determine, based on a determination that the third reference value is larger than the preset threshold, a third step angle set for a first scan according to the average value of the first step angle and the second step angle, control, according to the third step angle set, the camera module to perform the first scan so as to determine a third step angle in the third step angle set, and complete focusing according to the third step angle.

It can be seen that in this example, when the third reference value is larger than the preset threshold, according to the average value of the first step angle and the second step angle, the terminal limits the first scan to a reduced range, i.e., the third step angle set, thereby reducing the range of polling in the first scan, realizing accurate focusing according to the first scan, and increasing the accuracy of focusing.

In a possible example, the obtaining unit 610 configured to obtain the set of FV sampling parameter groups and the set of defocus value sampling parameter groups is configured to control, according to a fourth step angle set, the camera module to perform a second scan so as to obtain the set of FV sampling parameter groups and the set of defocus value sampling parameter groups, where each FV sampling parameter group in the set of FV sampling parameter groups includes a step angle in the fourth step angle set and a corresponding FV, and each defocus value sampling parameter group in the set of defocus value sampling parameter groups includes a step angle in the fourth step angle and a corresponding defocus value.

It can be seen that in the example, the terminal performs the second scan according to the fourth step angle set, and obtains the set of FV sampling parameter groups and the set of defocus value sampling parameter groups via a quick scan performed according to a large step amplitude, such that the terminal can determine a small range of focusing according to the set of FV sampling parameter groups and the set of defocus value sampling parameter groups, thereby facilitating accurate focusing and reducing time taken for focusing of the terminal.

It can be understood that the functions of the various program modules of the focusing device 400 can be realized according to the method described in the above method implementation. For detailed processes, reference can be made to related descriptions of the above method implementation, and details are not repeated herein.

The various functional units of the focusing device illustrated in FIG. 6 are further configured to implement the focusing method illustrated in FIG. 4.

The obtaining unit 610 is configured to obtain a set of FV sampling parameter groups.

The fitting unit 620 is configured to determine a first mapping relation between step angles and FVs according to the set of FV sampling parameter groups obtained by the obtaining unit 610 and a first predetermined fitting scheme, where the step angles are step angles of a camera driving device of a camera module.

The determining unit 630 is configured to determine a first step angle in a first step angle set according to the first mapping relation determined by the fitting unit 620, where an FV corresponding to the first step angle is maximum among FVs respectively corresponding to step angles in the first step angle set.

The processing unit 640 is configured to determine a focus point of the camera module according to the first step angle to complete focusing.

It can be seen that in the implementation of the present disclosure, the obtaining unit 610 of the focusing device 600 first obtains the set of FV sampling parameter groups. The fitting unit 620 determines the first mapping relation between the step angles and the FVs according to the set of FV sampling parameter groups and the first predetermined fitting scheme. The determining unit 630 determines the first step angle in the first step angle set according to the first mapping relation, where the FV corresponding to the first step angle is maximum among the FVs respectively corresponding to the step angles in the first step angle set. The processing unit 640 finally determines the focus point of the camera module according to the first step angle to complete focusing. It can be seen that after the terminal obtains the set of FV sampling parameter groups, without multiple scans, the terminal can determine the first step angle according to the first fitting scheme to complete focusing, and thus there is no need for the terminal to take a long time to perform multiple scans so as to complete focusing, thereby reducing time taken for focusing, reducing hardware cost, increasing a speed of focusing of the terminal, and prolonging service life of related hardware components.

In a possible example, the obtaining unit 610 configured to obtain the set of FV sampling parameter groups is configured to control, according to a fourth step angle set, the camera module to perform a second scan so as to obtain the set of FV sampling parameter groups, where each FV sampling parameter group in the set of FV sampling parameter groups includes a step angle in the fourth step angle set and a corresponding FV.

It can be seen that in the example, the terminal performs the second scan according to the fourth step angle set, and obtains the set of FV sampling parameter groups via a quick scan performed according to a large step amplitude, such that the terminal can determine a small range of focusing according to the set of FV sampling parameter groups, thereby facilitating accurate focusing and reducing time taken for focusing of the terminal.

It can be understood that the functions of the various program modules of the focusing device 600 can be realized according to the method described in the above method implementation. For detailed processes, reference can be made to related descriptions of the above method implementation, and details are not repeated herein.

The various functional units of the focusing device illustrated in FIG. 6 are further configured to implement the focusing method illustrated in FIG. 5.

The obtaining unit 610 is configured to obtain a set of defocus value sampling parameter groups.

The fitting unit 620 is configured to determine a second mapping relation between step angles and defocus values according to the set of defocus value sampling parameter groups obtained by the obtaining unit 610 and a second predetermined fitting scheme, where the step angles are step angles of a camera driving device of a camera module.

The determining unit 630 is configured to determine a second step angle in a second step angle set according to the second mapping relation determined by the fitting unit 620, where a defocus value corresponding to the second step angle is zero.

The processing unit 640 is configured to determine a focus point of the camera module according to the second step angle determined by the determining unit 630 to complete focusing.

It can be seen that in the implementation of the present disclosure, the obtaining unit 610 of the focusing device 600 first obtains the set of defocus value sampling parameter groups. The fitting unit 620 determines the second mapping relation between the step angles and the defocus values according to the set of defocus value sampling parameter groups. The determining unit 630 determines the second step angle in the second step angle set according to the second mapping relation. The processing unit 640 finally determines the focus point of the camera module according to the second step angle to complete focusing. It can be seen that after the terminal obtains the set of defocus value sampling parameter groups, without multiple scans, the terminal can determine the second step angle according to the second fitting scheme to complete focusing, and thus there is no need for the terminal to take a long time to perform multiple scans so as to complete focusing, thereby reducing time taken for focusing, reducing hardware cost, increasing a speed of focusing of the terminal, and prolonging service life of related hardware components.

In a possible example, the obtaining unit 610 configured to obtain the set of defocus value sampling parameter groups is configured to control, according to a fourth step angle set, the camera module to perform a second scan so as to obtain the set of defocus value sampling parameter groups, where each defocus value sampling parameter group in the set of defocus value sampling parameter groups includes a step angle in the fourth step angle and a corresponding defocus value.

It can be seen that in the example, the terminal performs the second scan according to the fourth step angle set, and obtains the set of defocus value sampling parameter groups via a quick scan performed according to a large step amplitude, such that the terminal can determine a small range of focusing according to the set of defocus value sampling parameter groups, thereby facilitating accurate focusing and reducing time taken for focusing of the terminal.

It can be understood that the functions of the various program modules of the focusing device 600 can be realized according to the method described in the above method implementation. For detailed processes, reference can be made to related descriptions of the above method implementation, and details are not repeated herein.

Figure 7:
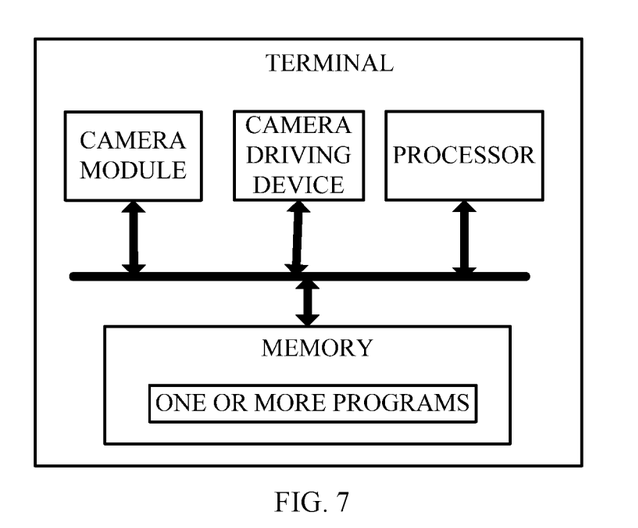
FIG. 7 is a schematic structural diagram illustrating a terminal according to an implementation of the present disclosure.

Referring to FIG. 7, FIG. 7 illustrates a terminal according to an implementation of the present disclosure. The terminal includes a processor, a camera module, a camera driving device, a memory, and one or more programs. The one or more programs are stored in the memory and configured to be executed by the processor. The one or more programs contain instructions for performing the following.

A set of FV sampling parameter groups and a set of defocus value sampling parameter groups are obtained. A first mapping relation between step angles and FVs is determined according to the set of FV sampling parameter groups and a first predetermined fitting scheme, and a second mapping relation between the step angles and defocus values is determined according to the set of defocus value sampling parameter groups and a second predetermined fitting scheme, where the step angles are step angles of the camera driving device of the camera module. A first step angle in a first step angle set is determined according to the first mapping relation, and a second step angle in a second step angle set is determined according to the second mapping relation, where an FV corresponding to the first step angle is maximum among FVs respectively corresponding to step angles in the first step angle set, and a defocus value corresponding to the second step angle is zero. Focusing is completed according to the first step angle and the second step angle.

It can be seen that in the implementation of the present disclosure, the terminal first obtains the set of FV sampling parameter groups and the set of defocus value sampling parameter groups, determines the first mapping relation between the step angles and the FVs according to the set of FV sampling parameter groups and the first predetermined fitting scheme, determines the second mapping relation between the step angles and the defocus values according to the set of defocus value sampling parameter groups and the second predetermined fitting scheme, determines the first step angle in the first step angle set according to the first mapping relation, determines the second step angle in the second step angle set according to the second mapping relation, and finally completes focusing according to the first step angle and the second step angle. It can be seen that after the terminal obtains the set of FV sampling parameter groups and the set of defocus value sampling parameter groups, without multiple scans, the terminal can determine the first step angle according to the first fitting scheme, and determine the second step angle according to the second fitting scheme, so as to complete focusing. Thus, there is no need for the terminal to take a long time to perform multiple scans so as to complete focusing, thereby reducing time taken for focusing, reducing hardware cost, increasing a speed of focusing of the terminal, and prolonging service life of related hardware components.

In a possible example, with respect to completing focusing according to the first step angle and the second step angle, the instructions in the programs are configured to perform the following. A difference between the first step angle and the second step angle is determined as a first reference value. Focusing is completed according to the first reference value.

In a possible example, with respect to completing focusing according to the first step angle and the second step angle, the instructions in the programs are configured to perform the following. The difference between the first step angle and the second step angle is determined as a second reference value. Whether the second reference value is smaller than or equal to a preset threshold is determined. An average value of the first step angle and the second step angle is determined based on a determination that the second reference value is smaller than or equal to the preset threshold. Focusing is completed according to the average value.

In a possible example, with respect to completing focusing according to the first step angle and the second step angle, the instructions in the programs are configured to perform the following. The difference between the first step angle and the second step angle is determined as a third reference value. Whether the third reference value is larger than the preset threshold is determined. Based on a determination that the third reference value is larger than the preset threshold, a third step angle set for a first scan is determined according to the average value of the first step angle and the second step angle. The camera module is controlled according to the third step angle set to perform the first scan so as to determine a third step angle in the third step angle set. Focusing is completed according to the third step angle.

In a possible example, with respect to obtaining the set of FV sampling parameter groups and the set of defocus value sampling parameter groups, the instructions in the programs are configured to perform the following. According to a fourth step angle set, the camera module is controlled to perform a second scan so as to obtain the set of FV sampling parameter groups and the set of defocus value sampling parameter groups, where each FV sampling parameter group in the set of FV sampling parameter groups includes a step angle in the fourth step angle set and a corresponding FV, and each defocus value sampling parameter group in the set of defocus value sampling parameter groups includes a step angle in the fourth step angle and a corresponding defocus value.

The one or more programs in the terminal illustrated in FIG. 7 further contain instructions for performing the following.

A set of FV sampling parameter groups is obtained. A first mapping relation between step angles and FVs is determined according to the set of FV sampling parameter groups and a first predetermined fitting scheme, where the step angles are step angles of the camera driving device of the camera module. A first step angle in a first step angle set is determined according to the first mapping relation, where an FV corresponding to the first step angle is maximum among FVs respectively corresponding to step angles in the first step angle set. A focus point of the camera module is determined according to the first step angle to complete focusing.

It can be seen that in the implementation of the present disclosure, the terminal first obtains the set of FV sampling parameter groups, determines the first mapping relation between the step angles and the FVs according to the set of FV sampling parameter groups and the first predetermined fitting scheme, determines the first step angle in the first step angle set according to the first mapping relation, and finally determines the focus point of the camera module according to the first step angle to complete focusing. It can be seen that after the terminal obtains the set of FV sampling parameter groups, without multiple scans, the terminal can determine the first step angle according to the first fitting scheme to complete focusing, and thus there is no need for the terminal to take a long time to perform multiple scans so as to complete focusing, thereby reducing time taken for focusing, reducing hardware cost, increasing a speed of focusing of the terminal, and prolonging service life of related hardware components.

In a possible example, with respect to obtaining the set of FV sampling parameter groups, the instructions in the one or more programs are configured to perform the following. According to a fourth step angle set, the camera module is controlled to perform a second scan so as to obtain the set of FV sampling parameter groups, where each FV sampling parameter group in the set of FV sampling parameter groups includes a step angle in the fourth step angle and a corresponding FV.

The one or more programs in the terminal illustrated in FIG. 7 further contain instructions for performing the following.

A set of defocus value sampling parameter groups are obtained. A second mapping relation between step angles and defocus values is determined according to the set of defocus value sampling parameter groups and a second predetermined fitting scheme, where the step angles are step angles of the camera driving device of the camera module. A second step angle in a second step angle set is determined according to the second mapping relation, where a defocus value corresponding to the second step angle is zero. A focus point of the camera module is determined according to the second step angle to complete focusing.

It can be seen that in the implementation of the present disclosure, the terminal first obtains the set of defocus value sampling parameter groups, determines the second mapping relation between the step angles and the defocus values according to the set of defocus value sampling parameter groups and the second predetermined fitting scheme, determines the second step angle in the second step angle set according to the second mapping relation, and finally determines the focus point of the camera module according to the second step angle to complete focusing. It can be seen that after the terminal obtains the set of defocus value sampling parameter groups, without multiple scans, the terminal can determine the second step angle according to the second fitting scheme to complete focusing, and thus there is no need for the terminal to take a long time to perform multiple scans so as to complete focusing, thereby reducing time taken for focusing, reducing hardware cost, increasing a speed of focusing of the terminal, and prolonging service life of related hardware components.

In a possible example, with respect to obtaining the set of defocus value sampling parameter groups, the instructions in the one or more programs are configured to perform the following. According to a fourth step angle set, the camera module is controlled to perform a second scan so as to obtain the set of defocus value sampling parameter groups, where each defocus value sampling parameter group in the set of defocus value sampling parameter groups includes a step angle in the fourth step angle and a corresponding defocus value.

Figure 8:
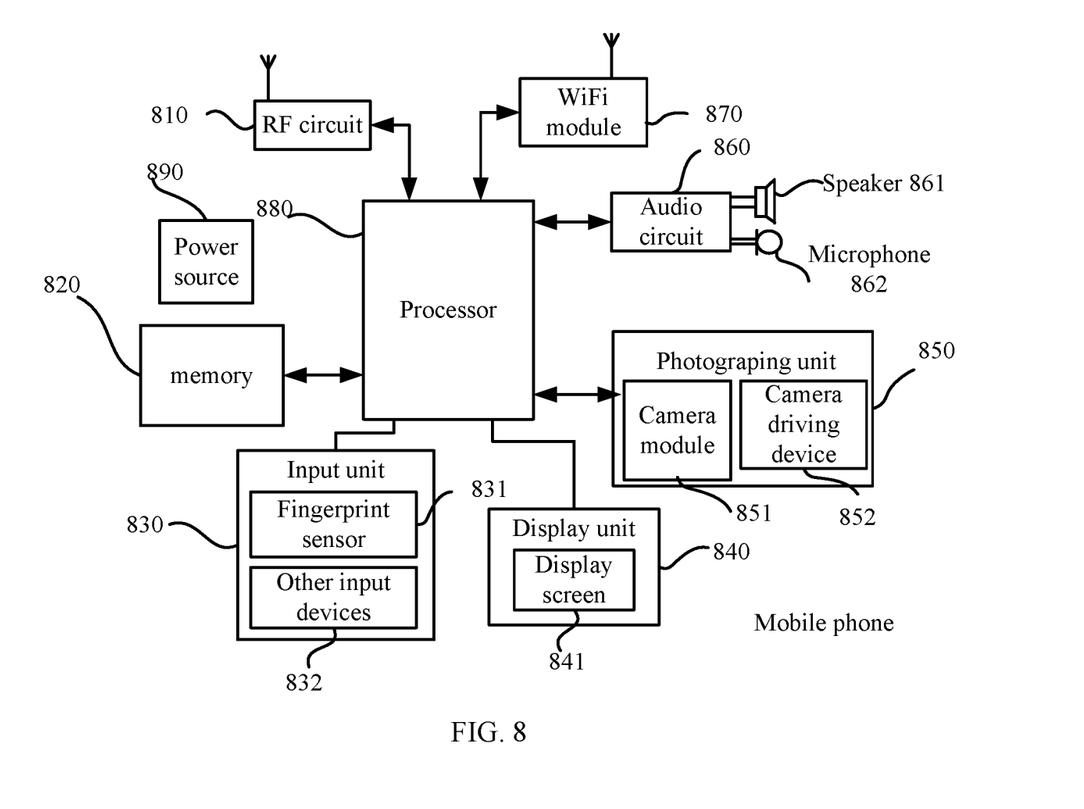
FIG. 8 is a schematic structural diagram illustrating a terminal according to another implementation of the present disclosure.

Implementations of the present disclosure further provides another terminal. As illustrated in FIG. 8, for simple illustration, only parts related to the implementations of the present disclosure are illustrated, and details are not disclosed. For details, reference may be made to the method implementations of the present disclosure. The terminal may be a mobile phone, a tablet computer, a personal digital assistant (PDA), a point of sales (POS), an on-board computer, or the like. The following describes a mobile phone as an example of the terminal.

FIG. 8 is a block diagram illustrating a part of a structure of a mobile phone related to a terminal according to an implementation of the present disclosure. With reference to FIG. 8, the mobile phone may include a radio frequency (RF) circuit 810, a memory 820, an input unit 830, a display unit 840, a photographing unit 850, an audio circuit 860, a wireless fidelity (Wi-Fi) module 870, a processor 880, a power supply 890, and so on. Those skilled in the art can understand that the structure of the mobile phone illustrated in FIG. 8 does not constitute any limitation on a mobile phone. The mobile phone may include more or fewer components than illustrated, a combination of some components, or different component arrangements.

The following will specifically illustrate various components of the mobile phone in combination with FIG. 8.

The RF circuit 810 is configured to receive and transmit information. Generally, the RF circuit 810 includes, but is not limited to, an antenna, at least one amplifier, a transceiver, a coupler, a low noise amplifier (LNA), a duplexer and the like. In addition, the RF circuit 810 may also communicate with network and other devices by wireless communication. The above wireless communication may use any communication standard or protocol, which includes but is not limited to global system of mobile communication (GSM), general packet radio service (GPRS), code division multiple access (CDMA), wideband code division multiple access (WCDMA), long term evolution (LTE), E-mail, short messaging service (SMS) and so on.

The memory 820 is configured to store software programs and modules. The processor 880 is configured to execute various function applications and data processing for the mobile phone by running the software programs and the modules stored in the memory 820. The memory 820 mainly includes a program storage area and a data storage area. The program storage area may store an operating system, application programs required for at least one function and so on. The data storage area may store data created according to use of the mobile phone (for example, step angles), and so on. In addition, the memory 820 may include a high-speed RAM, and may further include a non-volatile memory such as at least one disk storage device, a flash device, or other non-volatile solid storage devices.

The input unit 830 may be configured to receive input digital or character information and generate key signal input associated with user setting and function control of the mobile phone. In an example, the input unit 830 may include a fingerprint sensor 831 and other input devices 832. The fingerprint sensor 831 can collect data of user's fingerprint thereon. In addition to the fingerprint sensor 831, the input unit 830 may further include other input devices 832. In an example, the other input devices 832 may include, but is not limited to, one or more of a touch screen, a physical keyboard, function keys (such as volume control buttons, switch buttons and so on), a trackball, a mouse, and a joystick.

The display unit 840 is configured to display information input in response to the user's operation or information provided for the user or various menus of the mobile phone. The display unit 840 may include a display screen 841, and alternatively, the display screen 841 may be in the form of a liquid crystal display (LCD), an organic light-emitting diode (OLED) and so on. Although in FIG. 8, the fingerprint sensor 831 and the display screen 841 are used as two separate components to realize input and output functions of the terminal. In some implementations, the fingerprint sensor 831 may be integrated with the display screen 841 to realize input and playback functions of the mobile phone.

The photographing unit 850 may include a camera module 851 and a camera driving device 852. The photographing unit 850 is configured to expose sensitive mediums via light reflected by an object to perform photographing, upon detecting a wake-up operation on the camera module 851.

The mobile phone may also include at least one sensor (not illustrated), such as a light sensor, a motion sensor, and other sensors. In an example, the light sensor may include an ambient light sensor and a proximity sensor. Brightness of the display screen 841 may be adjusted according to brightness of ambient lights sensed by the ambient light sensor. The display screen 841 and/or backlight may be turned off when it is detected that the mobile phone reaches nearby the ear via the proximity sensor. As a kind of motion sensor, the accelerometer sensor can detect the magnitude of acceleration in all directions (typically three axes). When the mobile phone is stationary, the accelerometer sensor can detect the magnitude and direction of gravity. The accelerometer sensor can also identify mobile-phone gestures related applications (such as vertical and horizontal screen switch, related games, magnetometer attitude calibration), or the accelerometer sensor can be used for vibration-recognition related functions (such as a pedometer, percussion) and so on. The mobile phone can also be equipped with a gyro-sensor, a voltage detector, a humidity detector, a temperature detector, an infrared sensor and other sensors, and details are not repeated herein.

The audio circuit 860, a speaker 861, a microphone 862 may provide an audio interface between the user and the mobile phone. The audio circuit 860 may convert the received audio data into electrical signals and transfer the electrical signals to the speaker 861; thereafter the speaker 861 converts the electrical signals into sound signals to output. On the other hand, the microphone 862 converts the received sound signals into electrical signals, which may be received and converted into audio data by the audio circuit 860 to output. The audio data is then processed and transmitted by the processor 880 via the RF circuit 810 to another mobile phone for example, or, the audio data is output to the memory 820 for further processing.

Wi-Fi belongs to a short-distance wireless transmission technology. With aid of the Wi-Fi module 870, the mobile phone may assist the user in E-mail receiving and sending, webpage browsing, access to streaming media and the like. Wi-Fi provides the user with wireless broadband Internet access. Although the Wi-Fi module 870 is illustrated in FIG. 8, the Wi-Fi module 870 is not essential to the mobile phone and can be omitted according to actual needs without departing from the essential nature of the present disclosure.

The processor 880 is the control center of the mobile phone. The processor 880 is coupled to various parts of the whole mobile phone through various interfaces and lines, runs or executes software programs and/or modules stored in the memory 820 and invokes data stored in the memory 820 to perform various functions of the mobile phone and process data, thereby monitoring the mobile phone as a whole. Optionally, the processor 880 may include one or more processing units. For example, for the processor 880, an application processor may be integrated with a modem processor, where the application processor handles the operating system, user interfaces, applications, and so on, and the modem processor mainly processes wireless communication. It can be understood that the above-mentioned modem processor may not be integrated into the processor 880.

The mobile phone may also include the power supply 890 (e.g., a battery) that supplies power to various components. For example, the power supply may be logically connected to the processor 880 via a power management system to realize management of charging, discharging, and power consumption through the power management system.

Although not illustrated, the mobile phone may further include a camera, a Bluetooth module, and so on, and details are not repeated herein.

In the above implementation illustrated in FIG. 1 to FIG. 5, various method processes may be realized based on the structure of the mobile phone.

In the above implementation illustrated in FIG. 6, functions of various units may be realized based on the structure of the mobile phone.

Implementations of the present disclosure also provide a computer storage medium. The computer storage medium stores computer programs for electronic data interchange. The computer programs are operable with a computer to implement a part of or all operations of any of the above focusing methods recorded in the above method implementations.

Implementations of the present disclosure further provides a computer program product. The computer program product includes a non-transitory computer-readable storage medium that stores computer programs. The computer programs are operable with a computer to implement a part of or all operations of any of the above focusing methods recorded in the above method implementations.

It is to be noted that, for the sake of simplicity, the foregoing method implementations are described as a series of action combinations. However, it will be appreciated by those skilled in the art that the sequence of actions described may not be construed as limitation on the present disclosure. According to the present disclosure, certain operations may be performed in other order or simultaneously. Besides, it will be appreciated by those skilled in the art that the implementations described in the specification are exemplary embodiments and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, it can be understood that the apparatus disclosed in implementations provided herein may be implemented in other manners. For example, the device/apparatus implementations described above are merely illustrative. For instance, the division of the units is only a logical function division and there can be other division manners during actual implementations. For example, multiple units or components may be combined or may be integrated into another system, or some features may be ignored, omitted, or not performed. In addition, coupling or direct coupling or communication connection among illustrated or discussed components may be indirect coupling or communication connection among devices or units via some interfaces, and may be electrical connection, or other forms of connection.

The units described as separate components may or may not be physically separated. The components illustrated as units may or may not be physical units, that is, they may be in the same place or may be distributed to multiple network units. All or part of the units may be selected according to actual needs to achieve the technical solutions of the embodiments.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions operable with a computer device (which may be a personal computer, a server, or a network device and so on) to perform all or part of the operations described in the various method implementations of the present disclosure. The memory includes various mediums capable of storing program codes, such as a universal serial bus (USB) flash disk, a read-only memory (ROM), a random access memory (RAM), a movable hard disk, a disk, a compact disc (CD), and the like.

It will be understood by those ordinarily skilled in the art that all or a part of operations of the various methods of the implementations described above may be accomplished by means of a program to instruct associated hardware. The program may be stored in a computer-readable memory, which may include a flash memory, a ROM, a RAM, a disk or a CD, and so on.

The above illustrates the implementations of the present disclosure in detail. The specification employs specific examples to illustrate the principle and implementation manners of the present disclosure. The illustration of the above implementations is just used to help in understanding of the method and core concept of the present disclosure. For a person ordinarily skilled in the art, according to the concept of the present disclosure, changes may be made on the specific implementations and application range. In conclusion, the content of the specification shall not be understood to limit the present disclosure.

What is claimed is:

1. A focusing method, comprising:
   obtaining a set of focus value (FV) sampling parameter groups and a set of phase difference defocus value sampling parameter groups;
   determining a first mapping relation between step angles and FVs according to the set of FV sampling parameter groups and a first predetermined fitting scheme, and determining a second mapping relation between the step angles and defocus values according to the set of defocus value sampling parameter groups and a second predetermined fitting scheme, the step angles being step angles of a camera driving device of a camera module;
   determining a first step angle in a first step angle set according to the first mapping relation, and determining a second step angle in a second step angle set according to the second mapping relation, an FV corresponding to the first step angle being maximum among FVs respectively corresponding to step angles in the first step angle set, and a defocus value corresponding to the second step angle being zero; and
   completing focusing according to the first step angle and the second step angle.

2. The method of claim 1, wherein the completing focusing according to the first step angle and the second step angle comprises:
   determining a difference between the first step angle and the second step angle as a first reference value; and
   completing focusing according to the first reference value.

3. The method of claim 1, wherein the completing focusing according to the first step angle and the second step angle comprises:
   determining a difference between the first step angle and the second step angle as a second reference value;
   determining whether the second reference value is smaller than or equal to a preset threshold;
   determining an average value of the first step angle and the second step angle based on a determination that the second reference value is smaller than or equal to the preset threshold; and
   completing focusing according to the average value.

4. The method of claim 2, wherein the completing focusing according to the first step angle and the second step angle comprises:
   determining a difference between the first step angle and the second step angle as a second reference value;
   determining whether the second reference value is smaller than or equal to a preset threshold;
   determining an average value of the first step angle and the second step angle based on a determination that the second reference value is smaller than or equal to the preset threshold; and completing focusing according to the average value.

5. The method of claim 1, wherein the completing focusing according to the first step angle and the second step angle comprises:
determining a difference between the first step angle and the second step angle as a third reference value;
determining whether the third reference value is larger than a preset threshold;
determining, based on a determination that the third reference value is larger than the preset threshold, a third step angle set for a first scan according to an average value of the first step angle and the second step angle;
controlling, according to the third step angle set, the camera module to perform the first scan so as to determine a third step angle in the third step angle set; and
completing focusing according to the third step angle.

6. The method of claim 2, wherein the completing focusing according to the first step angle and the second step angle comprises:
determining a difference between the first step angle and the second step angle as a third reference value;
determining whether the third reference value is larger than a preset threshold;
determining, based on a determination that the third reference value is larger than the preset threshold, a third step angle set for a first scan according to an average value of the first step angle and the second step angle;
controlling, according to the third step angle set, the camera module to perform the first scan so as to determine a third step angle in the third step angle set; and
completing focusing according to the third step angle.

7. The method of claim 1, wherein the obtaining the set of FV sampling parameter groups and the set of defocus value sampling parameter groups comprises:
controlling, according to a fourth step angle set, the camera module to perform a second scan so as to obtain the set of FV sampling parameter groups and the set of defocus value sampling parameter groups, wherein each FV sampling parameter group in the set of FV sampling parameter groups comprises a step angle in the fourth step angle set and a corresponding FV, and wherein each defocus value sampling parameter group in the set of defocus value sampling parameter groups comprises a step angle in the fourth step angle set and a corresponding defocus value.

8. A mobile terminal, comprising:
a processor;
a camera module;
a camera driving device;
a memory; and
one or more programs;
the one or more programs being stored in the memory and configured to be executed by the processor;
the one or more programs comprising instructions configured to:
obtain a set of focus value (FV) sampling parameter groups and a set of phase difference defocus value sampling parameter groups;
determine a first mapping relation between step angles and FVs according to the set of FV sampling parameter groups and a first predetermined fitting scheme, and determine a second mapping relation between the step angles and defocus values according to the set of defocus value sampling parameter groups and a second predetermined fitting scheme, the step angles being step angles of the camera driving device of the camera module;
determine a first step angle in a first step angle set according to the first mapping relation, and determine a second step angle in a second step angle set according to the second mapping relation, an FV corresponding to the first step angle being maximum among FVs respectively corresponding to step angles in the first step angle set, and a defocus value corresponding to the second step angle being zero; and
complete focusing according to the first step angle and the second step angle.

9. The mobile terminal of claim 8, wherein the instructions configured to complete focusing according to the first step angle and the second step angle are configured to:
determine a difference between the first step angle and the second step angle as a first reference value; and
complete focusing according to the first reference value.

10. The mobile terminal of claim 8, wherein the instructions configured to complete focusing according to the first step angle and the second step angle are configured to:
determine a difference between the first step angle and the second step angle as a second reference value;
determine whether the second reference value is smaller than or equal to a preset threshold;
determine an average value of the first step angle and the second step angle based on a determination that the second reference value is smaller than or equal to the preset threshold; and
complete focusing according to the average value.

11. The mobile terminal of claim 9, wherein the instructions configured to complete focusing according to the first step angle and the second step angle are configured to:
determine a difference between the first step angle and the second step angle as a second reference value;
determine whether the second reference value is smaller than or equal to a preset threshold;
determine an average value of the first step angle and the second step angle based on a determination that the second reference value is smaller than or equal to the preset threshold; and
complete focusing according to the average value.

12. The mobile terminal of claim 8, wherein the instructions configured to complete focusing according to the first step angle and the second step angle are configured to:
determine a difference between the first step angle and the second step angle as a third reference value;
determine whether the third reference value is larger than a preset threshold;
determine, based on a determination that the third reference value is larger than the preset threshold, a third step angle set for a first scan according to an average value of the first step angle and the second step angle;
control, according to the third step angle set, the camera module to perform the first scan so as to determine a third step angle in the third step angle set; and
complete focusing according to the third step angle.

13. The mobile terminal of claim 9, wherein the instructions configured to complete focusing according to the first step angle and the second step angle are configured to:
determine a difference between the first step angle and the second step angle as a third reference value;
determine whether the third reference value is larger than a preset threshold;

determine, based on a determination that the third reference value is larger than the preset threshold, a third step angle set for a first scan according to an average value of the first step angle and the second step angle;

control, according to the third step angle set, the camera module to perform the first scan so as to determine a third step angle in the third step angle set; and complete focusing according to the third step angle.

14. The mobile terminal of claim 8, wherein the instructions configured to obtain the set of FV sampling parameter groups and the set of defocus value sampling parameter groups are configured to:

control, according to a fourth step angle set, the camera module to perform a second scan so as to obtain the set of FV sampling parameter groups and the set of defocus value sampling parameter groups, wherein each FV sampling parameter group in the set of FV sampling parameter groups comprises a step angle in the fourth step angle set and a corresponding FV, and wherein each defocus value sampling parameter group in the set of defocus value sampling parameter groups comprises a step angle in the fourth step angle set and a corresponding defocus value.

15. A non-transitory computer-readable storage medium storing computer programs for electronic data interchange, the computer programs causing a computer to: obtain a set of focus value (FV) sampling parameter groups and a set of phase difference defocus value sampling parameter groups; determine a first mapping relation between step angles and FVs according to the set of FV sampling parameter groups and a first predetermined fitting scheme, and determine a second mapping relation between the step angles and defocus values according to the set of defocus value sampling parameter groups and a second predetermined fitting scheme, the step angles being step angles of a camera driving device of a camera module; determine a first step angle in a first step angle set according to the first mapping relation, and determine a second step angle in a second step angle set according to the second mapping relation, an FV corresponding to the first step angle being maximum among FVs respectively corresponding to step angles in the first step angle set, and a defocus value corresponding to the second step angle being zero; and complete focusing according to the first step angle and the second step angle.

16. The computer-readable storage medium of claim 15, wherein the computer programs causing the computer to complete focusing according to the first step angle and the second step angle cause the computer to:

determine a difference between the first step angle and the second step angle as a first reference value; and complete focusing according to the first reference value.

17. The computer-readable storage medium of claim 15, wherein the computer programs causing the computer to complete focusing according to the first step angle and the second step angle cause the computer to:

determine a difference between the first step angle and the second step angle as a second reference value;

determine whether the second reference value is smaller than or equal to a preset threshold;

determine an average value of the first step angle and the second step angle based on a determination that the second reference value is smaller than or equal to the preset threshold; and complete focusing according to the average value.

18. The computer-readable storage medium of claim 15, wherein the computer programs causing the computer to complete focusing according to the first step angle and the second step angle cause the computer to:

determine a difference between the first step angle and the second step angle as a third reference value;

determine whether the third reference value is larger than a preset threshold;

determine, based on a determination that the third reference value is larger than the preset threshold, a third step angle set for a first scan according to an average value of the first step angle and the second step angle;

control, according to the third step angle set, the camera module to perform the first scan so as to determine a third step angle in the third step angle set; and complete focusing according to the third step angle.

19. The computer-readable storage medium of claim 16, wherein the computer programs causing the computer to complete focusing according to the first step angle and the second step angle cause the computer to:

determine a difference between the first step angle and the second step angle as a third reference value;

determine whether the third reference value is larger than a preset threshold;

determine, based on a determination that the third reference value is larger than the preset threshold, a third step angle set for a first scan according to an average value of the first step angle and the second step angle;

control, according to the third step angle set, the camera module to perform the first scan so as to determine a third step angle in the third step angle set; and complete focusing according to the third step angle.

20. The computer-readable storage medium of claim 15, wherein the computer programs causing the computer to obtain the set of FV sampling parameter groups and the set of defocus value sampling parameter groups cause the computer to:

control, according to a fourth step angle set, the camera module to perform a second scan so as to obtain the set of FV sampling parameter groups and the set of defocus value sampling parameter groups, wherein each FV sampling parameter group in the set of FV sampling parameter groups comprises a step angle in the fourth step angle set and a corresponding FV, and wherein each defocus value sampling parameter group in the set of defocus value sampling parameter groups comprises a step angle in the fourth step angle set and a corresponding defocus value.

\* \* \* \* \*